US006891284B2

(12) United States Patent  
Tilley (10) Patent No.: US 6,891,284 B2  
(45) Date of Patent: May 10, 2005

(54) ELECTRONIC TIMER WITH PHOTOSENSOR

(76) Inventor: David A Tilley, 2563 Hartwell Ct., Lancaster, PA (US) 17601

( * ) Notice: Subject to any disclaimer, the term of this patent is extended or adjusted under 35 U.S.C. 154(b) by 165 days.

(21) Appl. No.: 10/418,059

(22) Filed: Apr. 18, 2003

(65) Prior Publication Data

US 2004/0206609 A1 Oct. 21, 2004

(51) Int. Cl.[7] .............................................. H01H 35/00
(52) U.S. Cl. ..................... 307/116; 307/140; 307/117; 200/51 R; 200/61.02; 200/330
(58) Field of Search .......................... 200/51 R, 51.12, 200/330, 331, 61.02; 307/116, 117, 140; 340/521; 315/149–151, 159

(56) References Cited

U.S. PATENT DOCUMENTS

| | | | |
|---|---|---|---|
| 3,584,222 A | * | 6/1971 | Nesbitt ........................ 250/206 |
| 4,198,563 A | | 4/1980 | Elssner |
| 4,209,728 A | | 6/1980 | Membreno |
| 4,277,728 A | | 7/1981 | Stevens |
| 4,349,748 A | * | 9/1982 | Goldstein et al. ........ 307/132 E |
| 4,451,763 A | | 5/1984 | Sodini |
| 4,575,659 A | | 3/1986 | Pezzolo et al. |
| RE32,450 E | | 6/1987 | Blake |
| 4,733,103 A | | 3/1988 | Itoh et al. |
| 4,751,399 A | | 6/1988 | Koehring et al. |
| 4,912,376 A | | 3/1990 | Strick |
| 5,101,141 A | | 3/1992 | Warner et al. |
| 5,280,220 A | | 1/1994 | Carter |
| 5,325,023 A | | 6/1994 | Martich |
| 5,397,869 A | * | 3/1995 | Huen ........................... 200/330 |
| 5,397,930 A | | 3/1995 | Nilssen |
| 5,408,162 A | | 4/1995 | Williams |
| 5,455,488 A | | 10/1995 | Rhoades et al. |
| 5,519,286 A | | 5/1996 | Rodrigues et al. |
| 5,548,189 A | | 8/1996 | Williams |
| 5,561,351 A | | 10/1996 | Vrionis et al. |
| 5,592,033 A | | 1/1997 | Gold |
| 5,699,243 A | | 12/1997 | Eckel et al. |
| 5,701,058 A | | 12/1997 | Roth |
| 5,811,942 A | | 9/1998 | Pedretti |
| 5,946,209 A | | 8/1999 | Eckel et al. |
| 6,013,985 A | | 1/2000 | Green et al. |
| 6,025,679 A | | 2/2000 | Harper et al. |
| 6,028,396 A | | 2/2000 | Morrissey, Jr. et al. |
| 6,060,838 A | | 5/2000 | Cantoni et al. |
| 6,120,165 A | | 9/2000 | Shalvi |
| 6,121,875 A | | 9/2000 | Hamm et al. |
| 6,188,177 B1 | | 2/2001 | Adamson et al. |
| 6,262,496 B1 | * | 7/2001 | Lamar et al. ............... 307/117 |
| 6,380,852 B1 | * | 4/2002 | Hartman et al. ............ 340/521 |
| 6,452,339 B1 | | 9/2002 | Morrissey et al. |
| 6,522,078 B1 | * | 2/2003 | Okamoto et al. ........... 315/149 |

* cited by examiner

Primary Examiner—Michael A. Friedhofer
(74) Attorney, Agent, or Firm—Stites & Harrison PLLC (57) ABSTRACT

A switch and method are provided for turning on and off an electrical device. The switch includes a control module, having a time module and an electrical output to which an electrical device can be connected. The time module includes a clock which is programmable to disconnect power to the electrical device at a set-off time. A light sensor is operatively associated with the control module and transmits a light signal to the control module based on light level. The control module is adapted to provide power to the electrical output when the light module indicates that the light level is below a threshold level and the time is before the set-off time thereby providing power to an electrical device connected to the electrical output.

25 Claims, 7 Drawing Sheets

ELECTRONIC TIMER WITH PHOTOSENSOR

FIELD OF THE INVENTION

The present invention relates to a device for controlling power to an electrical device, and in particular, the present invention relates to an electronic timer with photosensor to control power to an electronic device.

BACKGROUND OF THE INVENTION

Most homes have a front outdoor light. The light serves the dual purpose of lighting the way for occupants and guests and also for discouraging unwanted guests such as prowlers or burglars.

In order for the front light to serve its purpose, typically someone has to be home at dusk to turn the light on. If not, an unlighted front walkway may pose a potentially dangerous situation. Further, if an injury or burglary occurs while no outdoor lights are on, the homeowner could be open to possible personal liability for negligence.

One solution to this problem of having to be home to turn on the light is to install a photocell activated switch such as the Model DEC-6308 from Leviton Corp. This switch will turn on an outdoor spot light whenever ambient light falls below a threshold level. One disadvantage with this switch is that the light will stay on all night until ambient light rises above the threshold level. While having the light on all night may be appropriate for some locations, it is not ideal for all lighting applications. For example, in the interest of energy conservation and minimizing electrical energy bills, most homeowners will opt to not have their lights on all night. Another problem with this solution is that a special fixture must be mounted somewhere outside and AC power must be wired to the outdoor fixture. This usually will require the services of a trained electrician at considerable expense to the property owner.

Another possible solution for providing control of an outdoor light is to buy an in-wall timer switch such as the Model EL483 from Intermatic Corp. These switches are reasonably priced, relatively easy to install and can turn outside lights on and off at preprogrammed times. While this solution overcomes some disadvantages of prior switches, it has significant shortcomings. For example, since dusk changes between four and five hours over the course of a year, either the lights will be on during daylight hours (a sure indication to a potential burglar that no one is at home) or the timer will have to be regularly reprogrammed to keep up with the changing time of sunset. Therefore, the homeowner is burdened with a task of regularly reprogramming the timer. Moreover, the current timer switches of this type are somewhat intimidating to operate for "technophobes", children, and the elderly.

A further outdoor lighting solution includes an outdoor light which has a photosensor and a pre-set timer which functions to turn the light on at dusk or dark and then off at a pre-set number of hours after the light turns on. An operator sets the pre-set number of hours of how long the light should remain on after dusk/dark. For example, if the timer is set for five hours, the light will come on at dusk/dark, whenever that occurs, and then the timer will turn the light off five hours later. A disadvantage with this type of lighting option is that depending on when sunset is, if the pre-set time is too short, the lights may not remain on for a sufficient time into the night to meet ones security and safety needs. Alternative, setting the timer longer will mean that the lights will stay on longer than necessary during part of the year when sunset is later in the evening. Therefore, in order to maximize energy efficiency and home security, one is left with the option of having to periodically and repeatedly adjust the timer setting on the light.

In addition to using outdoor lights, homeowners often use indoor lights and lamps to provide home security and to ward off potential intruders. Devices to automatically turn on and off in-house lights and lamps include readily available separate timers and photosensors. Depending on the desired control, a consumer can use a timer to turn an electronic device, such as a lamp, on and off at specific times. Alternatively, using a photosensor switch, one can turn a lamp on and off when the outdoor light levels drop below a threshold level.

Typically, individual timer switches and photoelectric switches plug directly into a power outlet and the lamp or other electrical device plugs into the respective timer switch or photoelectric switch. In the case of a photoelectric sensor switch, the photoelectric sensor is placed in the proximity of a window or in a location which receives outdoor light so that the photoelectric sensor will operate properly to turn on and off the electric device at the appropriate lighting conditions. These in-house timer switches and photoelectric switches suffer from many of the same disadvantages as the switches for controlling outdoor lights which was previously noted.

SUMMARY OF THE INVENTION

The present invention relates to a switch with a combination timer and photoelectric sensor which operates to turn on an electrical device when lighting conditions fall below a threshold level and to then turn off the electrical device at a programmed time.

In accordance with one aspect of the present invention, a switch is provided for turning on and off an electrical device. The switch includes a control module and a light sensor module. The control module includes a timer module and an electrical output to which an electrical device is to be connected. The time module includes a clock programmable for disconnecting power to the electrical device at a set-off time. The light sensor is wirelessly connected to the control module. The light sensor module transmits a light signal to the control module based on light level. The control module is adapted to provide power to the electrical output when the light sensor indicates the light level is below a threshold level and the time is before the set-off time thereby providing power to an electrical device connected to the electrical output of the switch.

In accordance with another aspect of the present invention, a wall switch is provided to turn on and off an electrical device. The switch includes a control module having a body dimensioned to fit into a standard electrical wall box. The control module has an electrical output connectable to an electrical device and a time module with a clock which is programmable for disconnecting power to the electrical outlet at a set-off time. A light sensor is operatively associated with the control module and transmits a light signal to the control module based on light level. The control module is adapted to provide power to the electrical output when the light signal indicates the light level is below a threshold level and the time is before the set-off time thereby providing power to an electrical device connected to the electrical output.

In accordance with yet another aspect of the present invention, a wall outlet timer is provided for turning on and off an electrical device. The timer includes a control module having a time module, a plug with prongs to fit into a wall power outlet, and an appliance outlet. The time module includes a clock which is programmable for disconnecting power to the electric device at a set-off time. A light sensor module is operatively associated with the control module and transmits a light sensor signal to the control module based on light level. The control module is adapted to provide power to the appliance outlet when the light signal indicates the light level is below a threshold level and the time is before the set-off time.

In accordance with yet another aspect of the present invention, a method is provided for turning on an electrical device when lighting conditions fall below a threshold level and off at a set-off time. The method includes connecting an electrical device to a timer module and providing a light sensor operatively associated with the timer module. A light signal is sent from a light sensor to the timer module only when the lighting condition transitions from (1) above to below a threshold level or (2) below to above a threshold light level. Further, the method includes setting a set-off time on the timer module after which the electrical device is to be turned off. Power is provided to the electrical device when both the light sensor indicates the light level is below a threshold level and the time is before the programmed set-off time.

BRIEF DESCRIPTION OF THE DRAWINGS

The invention will now be described in greater detail with reference to the preferred embodiments illustrated in the accompanying drawings, in which like elements bear like reference numerals, and wherein:

FIGS. 1a–1d are elevation views from different directions of a control module in accordance with the present invention, where FIG. 1a is a front elevation view, FIG. 1b is a top view and FIG. 1c is a side elevation view of the control module.

FIGS. 2a–2d are elevation views from different directions of a sensor module in accordance with the present invention, where FIG. 2b is a top elevation view.

DESCRIPTION OF THE PREFERRED EMBODIMENTS

Referring now to FIGS. 1a–1d in one embodiment, a switch comprises a control module 11 which is mounted in place of a standard wall mounted light switch. The control module 11 includes a main portion housed in a body 12, which mounts inside an existing wall box 13, and a faceplate 14 which mounts over an existing switch plate 15 known in the art.

The control module body 12 and faceplate 14 are linked together by a faceplate cable 16 which is fed through the normal opening in the switch plate 15. The faceplate 14 contains a digital display 17 which displays the current time of day and is used to set the off time using the control buttons 18 on top of the faceplate 14.

Figures 1A, 1B, 1C:
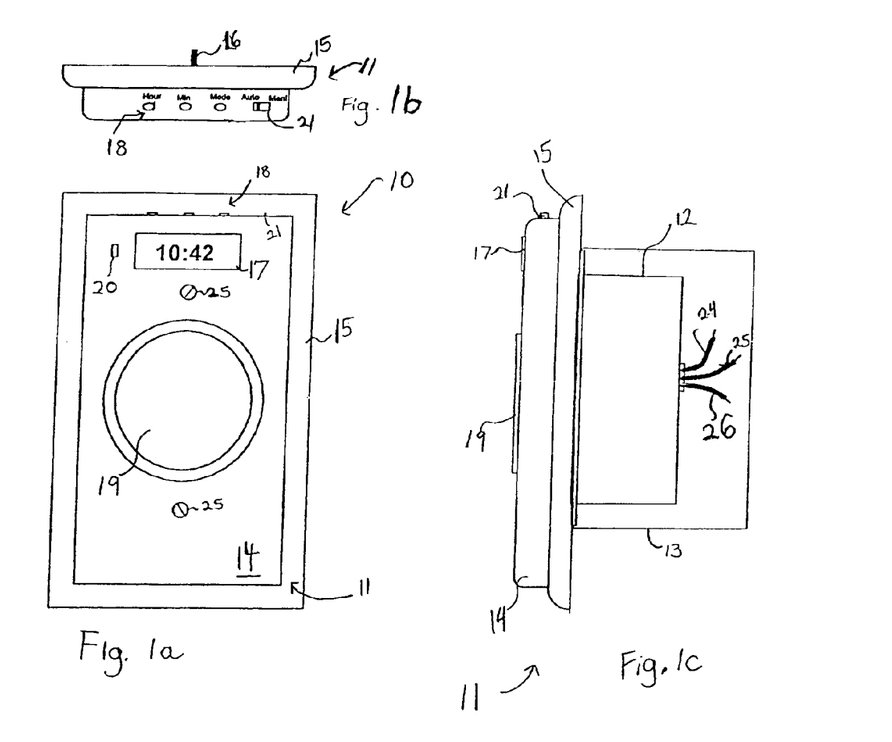

The faceplate 14 also includes a touch switch 19 which can be used at any time to manually toggle power to an electrical device connected to the switch. Advantageously, the touch switch 19 is relatively large so as to be easy to operate. A small, light-on indicator 20 on the faceplate 14 will illuminate whenever power is being provided to an electrical device connected to the switch, such as an outdoor light. An auto-manual switch 21 on the top of faceplate 14 can be used to completely disable automatic operation of the switch.

On the back of the faceplate 14 (FIG. 1d), a control module unit ID code switch 22, comprising four individual switches 22a–d, is used to set one of sixteen different codes to identify the control module 11. A connector 23 provides an input port for the faceplate cable 16 to be attached.

Figure 1D:
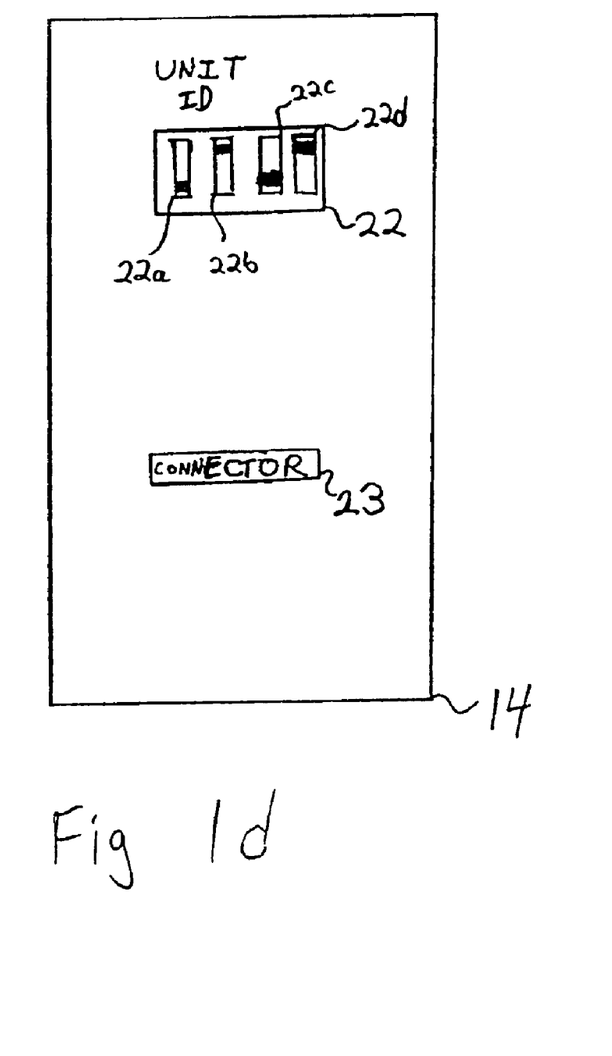
FIG. 1d is a rear elevation view of a faceplate for the control module.

Installation of the control module 11 is comparable to that of an ordinary light switch where one connects respective hot wire (black) 24, neutral wire (white) 25 and dual switch wire (red) 26 to the appropriate house wiring. The dual switch wire 26 is only used for dual switch operation but should have a wire nut on it even if it is not connected. A standard switch plate 15 is installed over the wall box 13 while feeding the faceplate cable 16 through the opening in the switch plate 15. Next, the faceplate cable 16 is plugged into the connector 23 on the back of the faceplate 14 (FIG. 1d). Any extra faceplate cable 16 is fed back into the control module body 12 and then the faceplate 14 is securely mounted over the switch plate 15 using two slot screws 25.

Programming of the time-of-day and set-off time is analogous to programming a digital alarm clock. To program the time-of-day, the button labeled "hour" is used to change the hour, the one labeled "min" changes the minutes. To program the set-off time, one holds down the "mode" button while changing the hours and minutes.

Referring now to FIGS. 2a–2d, the sensor module 30 includes light sensor 31 comprised of solar cells and transmitter 32. Advantageously, the sensor module 30 is solar powered. The solar power is generated from the solar cells of the light sensor 31. The sensor module 30 should be mounted anywhere the light sensor 31 has access to outdoor light such as on the inside top of any convenient household window 33 and within one hundred and fifty feet of the control module 11.

While sensor module 30 is solar powered, alternatively, the sensor module can be powdered by batteries or the sensor module may be connected to household current.

Figure 2A:
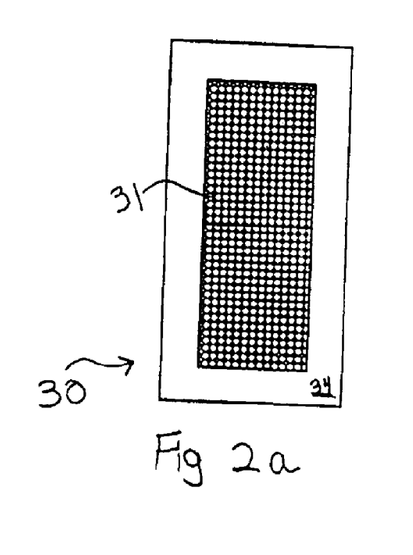
FIG. 2a is a front elevation view.
Figure 2B:
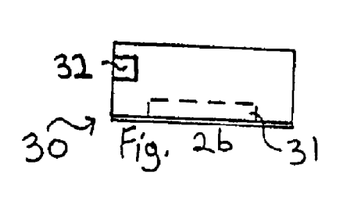

Adhesive is provided on front surface 34 allowing for installation of the sensor module 30 by pressing the sensor module 30 onto the window 33. The window 33 should not be directly in front of the outdoor light. Accordingly, a possible window may be an upstairs or side window. Since the sensor module 30 generates its own power from the solar cells, no other wire connections or batteries are required to power the sensor module 30.

Figure 2C:
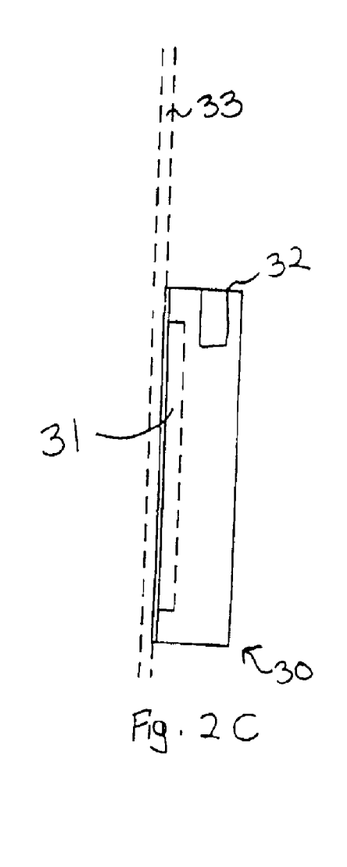
FIG. 2c is a side elevation view.
Figure 2D:
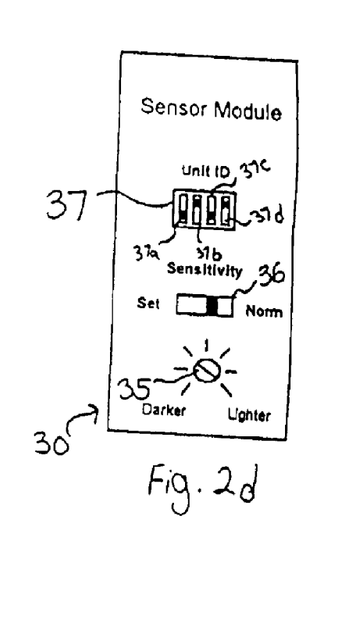
FIG. 2d is a rear elevation view.

The sensor module 30 has a sensitivity adjustment screw 35 to allow the light-on threshold to be adjusted. This may be desirable depending on the proximity of the sensor module 30 to other outside lights. To set the sensitivity adjustment level, one should wait until the daylight has reached the level at which the outdoor light or other electrical device connected to the control module 11 should come on. Then the sensitivity switch 36 is moved from "Norm" to "Set". Next, the sensitivity adjustment screw 35 is slowly turned just until the outside light comes on. Finally, the sensitivity switch 36 is returned to the "Norm" position. As a result of this procedure, a threshold light level, also referred to as a light-on level (Vref) is set.

A sensor module unit ID code switch 37 permits the digital code of the transmitter 32 to be changed in the event of interference with other control modules within the transmission range of control module 11. A new sensor module ID code is selected by moving the four slide switches 37a–37d up or down to a new number. A corresponding code is set in the same manner on the control module unit ID switch 22. The code of the sensor module ID switch 37 must match the code on the control module unit ID switch 22 located on the control module faceplate 14 for the switch to function properly.

Figure 3:
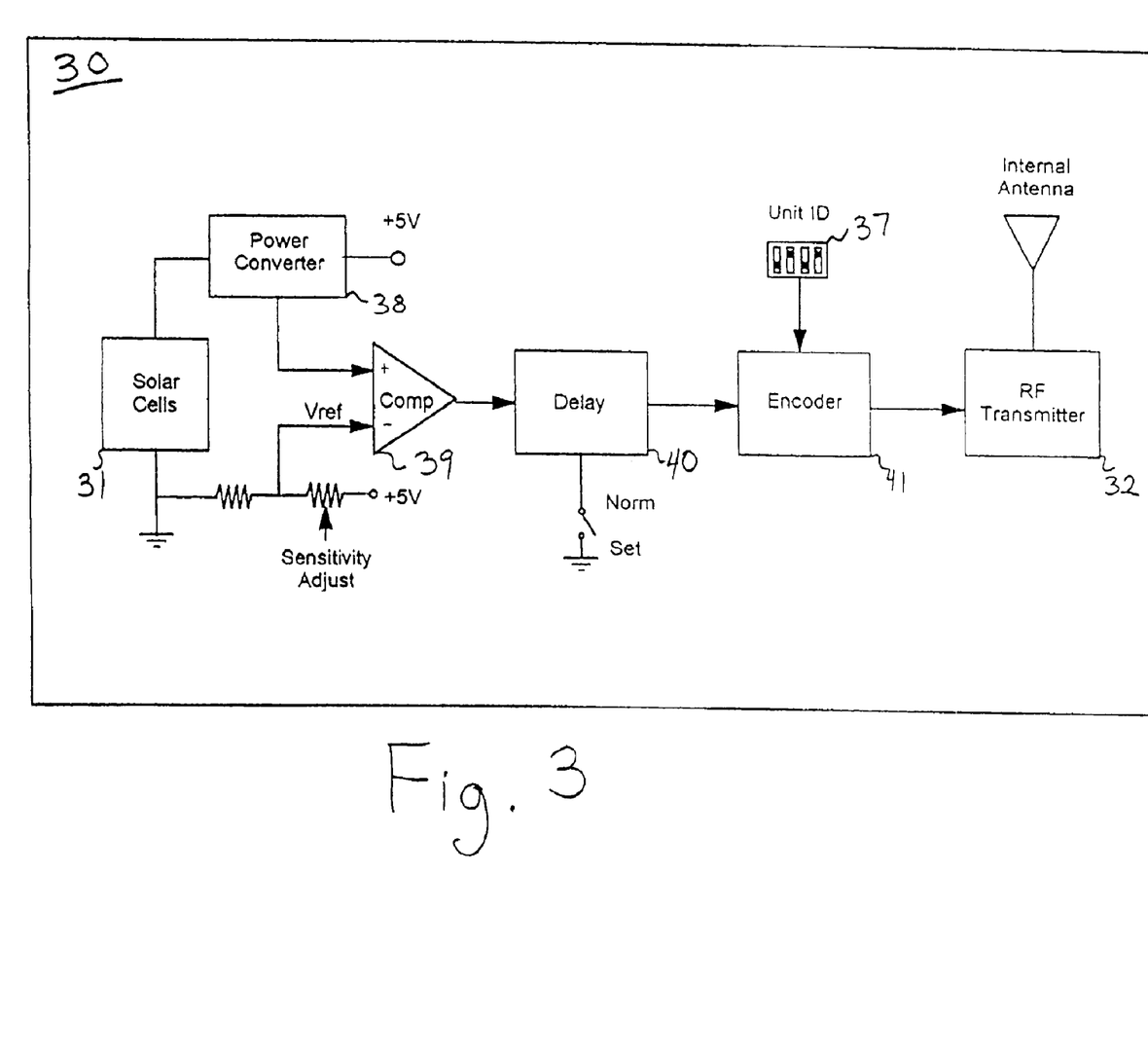
FIG. 3 is an electrical schematic of a sensor module circuit for the sensor module of FIG. 2.

FIG. 3 shows a block diagram for the sensor module 30. As noted, sensor module 30 is fully self-powered using the light sensor 31 comprised of several solar cells to recharge an internal power converter 38. Current from the solar cells is directly proportional to the amount of light exposure of the light sensor 31. Therefore, the current from the solar cells are also used as the method to measure the level of daylight, i.e., outside light level. The power converter 38 converts current flow to a proportional voltage which is fed to the comparator circuit 39. The comparator circuit 39 determines whether the daylight is above or below a present light-on threshold as will be discussed in further detail below.

It should be noted that the sensor module 30 will indicate a change in outdoor lighting based on both the daylight level and the adjustment of the light-on level (Vref). When the comparator circuit 39 determines the outdoor light level has transitioned or changed between a threshold light level, the comparator circuit 39 will send a signal to a delay block 40 which requires that any detected change be maintained for three minutes before it is registered as a valid transition. The delay is overridden when the sensitivity switch 36 (FIG. 2d) is in the "Set" position during the sensitivity threshold adjustment procedure.

A valid transition is then fed from the delay block 40 to the encoder block 41 which detects either a low→high transition or a high→low transition. To save power and reduce RF transmissions, the comparator circuit 39 determines if the light levels are below a threshold level. Therefore, advantageously, only when lighting conditions transition from above to below or below to above threshold levels is a signal encoded and transmitted to the control module 11 via a transmitter 32.

Alternatively, in an another embodiment, rather than just sending a threshold light level transition signal from the sensor module to the control module 11, an alternative sensor module can send a continuous signal to the control module 11, after the light level transitions from high→low or low→high.

Various light level signal encoding methods are possible including pulse width modulation, frequency modulation, pulse code modulation, etc., depending on the degree of noise immunity required.

This encoded signal is then transmitted from the sensor module 30 to the control module 11 using a small, low power radio frequency transmitter 32 such as transmitters used in garage door openers and other wireless consumer products. These low modules typically operate in the 300 MHz band, have a range up to one hundred and fifth feet and do not require an external antenna.

Alternatively, rather than transmitting the light level transition signal by RF, the light level signal may be transmitted by IR, or carrier current frequency. In yet an alternative embodiment the light level signal is sent via a wire connecting the sensor module and control module.

Figure 4:
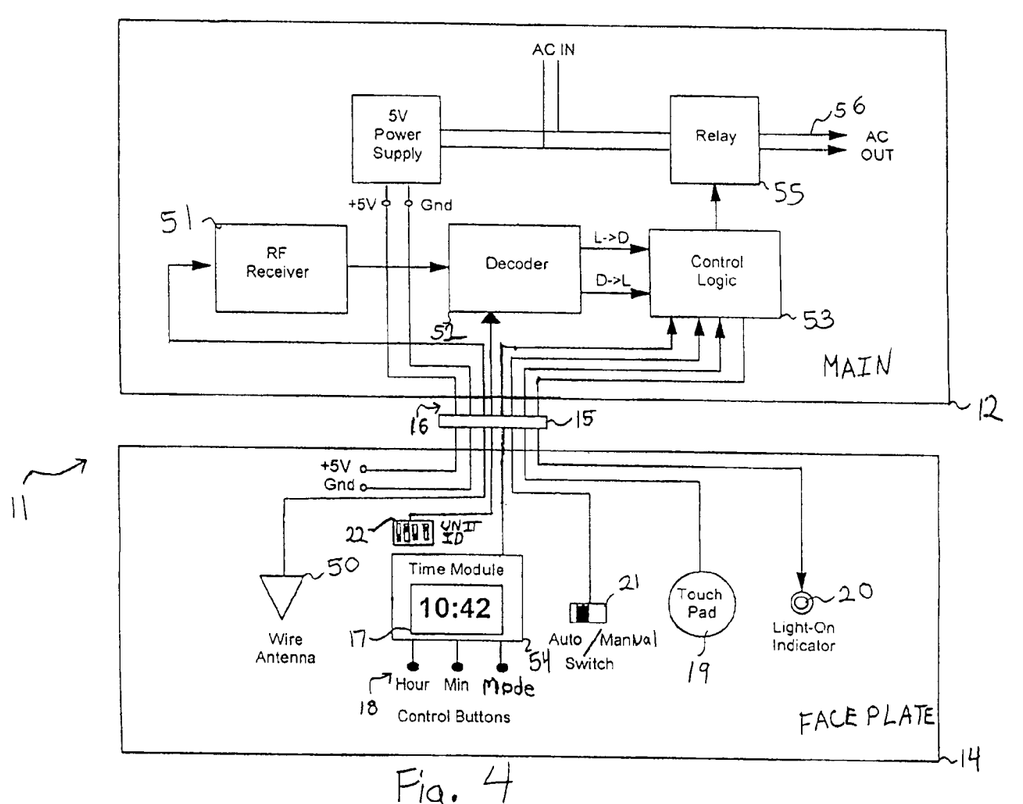
FIG. 4 is an electrical schematic of a control module circuit for the control module of FIG. 1.

FIG. 4 shows a block diagram of the circuit logic for control module 11. From a short wire antenna 50, a matched RF receiver 51 is used to detect the encoded RF signal, i.e., the light level transition signal, sent from the sensor module 30. A decoder block 52 is used to first verify the proper sensor module unit ID code. Then, the decoder block 52 decodes the sensor data to produce the light→dark (L→D) and dark→light (D→L) signals for the control logic 53. These signals, along with inputs from the time module 54, auto-manual switch 21 and the touch pad 19 are used by the control logic 53 to determine when to provide power to an electrical device such as an outdoor light attached to the control module 11.

When power is being provided to the electrical device, the control logic block 53 turns on a power relay 55 (or Triac) to supply AC power to the electrical device. The control logic 53 also turns the light-on indicator 20 on the faceplate 14 to confirm that power is being provided. When the electrical device, e.g., a light is to be off, the control logic 53 turns off both the relay 55 and the light-on indicator 20.

FIGS. 5a–5f illustrate how the different inputs to the control logic 53 affect an outdoor light. The method shown in FIGS. 5a–5f is pulse width modulation where a high→low transition is represented by a narrow pulse and a low→high transition is represented as a wider pulse. The unit ID switches 22, 37 provide additional noise immunity by attaching an encoded four bit unit ID with the data from the sensor module 30.

Figure 5A:
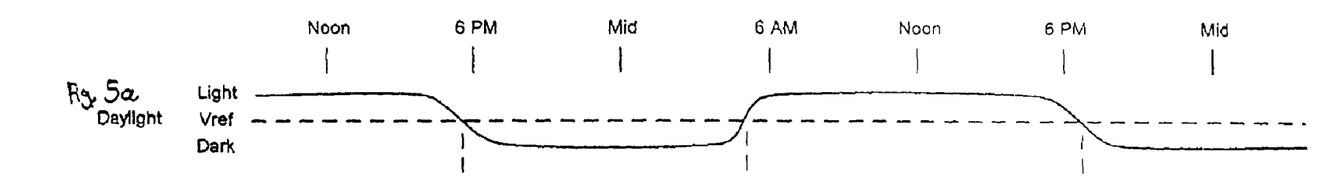
FIGS. 5a–5f depict sensor and control module timing diagrams in accordance with the present invention.
Figure 5B:
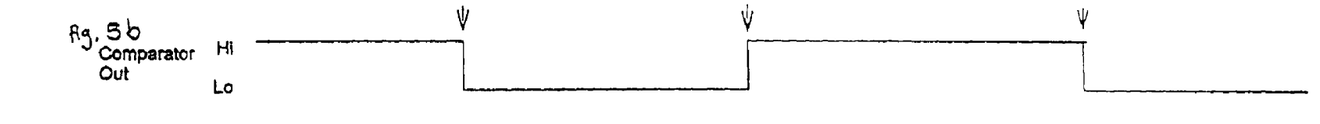
Figure 5C:
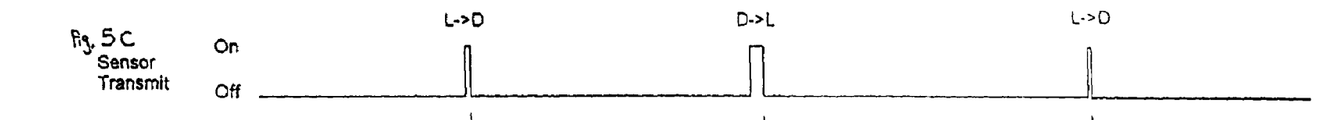
Figure 5D:
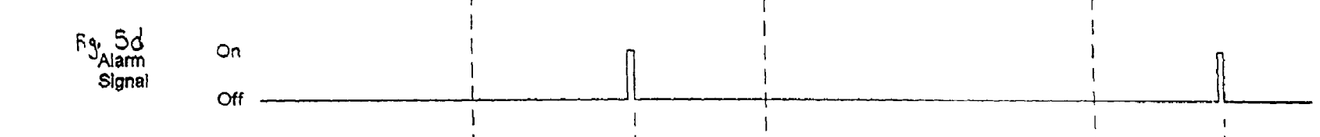
Figures 5E, 5F:
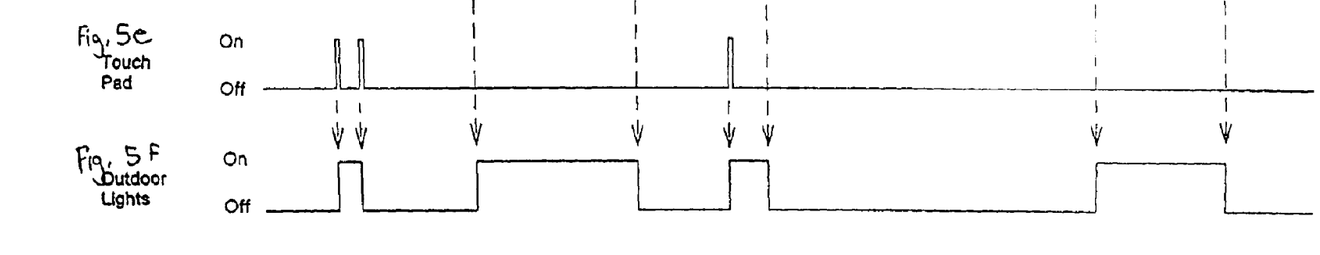

Whenever the touch pad 19 is pressed, the touch pad 19 toggles power to the electrical device to the opposite state. This is true in the automatic or manual mode of operation and is shown in FIGS. 5e and 5f. Next, assuming the switch is in the automatic mode, when a L→D pulse is received (at dusk), the outdoor light is turned on as shown in FIGS. 5c and 5f. The light stays on until the alarm signal is received from the time module or until the D→L signal is received (at dawn) as shown in FIGS. 5c, 5d and 5f.

As compared to a security system or a garage door opener, the consequences of a false alarm on the present switch are minimized. For example, several methods and elements are provided for liming or eliminating false alarms. Below is a list of some typical false alarm cases along with the methods used for their prevention.

A first false alarm case is that room lights are turned on in a location where the sensor module is located. In the present switch, the light sensor 31 is completely enclosed in a recessed fashion within the sensor module 30 to prevent indoor lights from activating the sensor module 30.

A second false alarm case is that outdoor lights are too close to the sensor module 30. The present sensor module 30 accommodates this scenario by using the sensitivity adjustment screw 35 on the back of the sensor module 30 to reduce the sensitivity to outdoor lighting. However, it is recommended that the sensor module 30 should be mounted in a window facing away from bright outdoor lights.

A third false alarm case is that passing automobile headlights may shine light onto sensor module 30, thereby "tricking" the light sensor module 30 into thinking it is daylight. This scenario will have minimal effect on the present switch in that the light signal must stay above or below the threshold level for approximately three minutes before the light→dark or dark→light signal is transmitted from the sensor module 30 to the control module 11.

A fourth false alarm case is that radio frequency interference from garage door openers, other switch units, etc., will interfere with the operation of the switch. The present switch overcomes this event by employing a unique four bit code for control module 11 and sensor module 30 so that the control module 11 can determine if a 300 MHz radio frequency signal is coming from its sensor module 30. If necessary, this code can be easily changed via resetting switches 22 and 37 on the control module 11 and sensor module 30, respectively.

Figure 6:
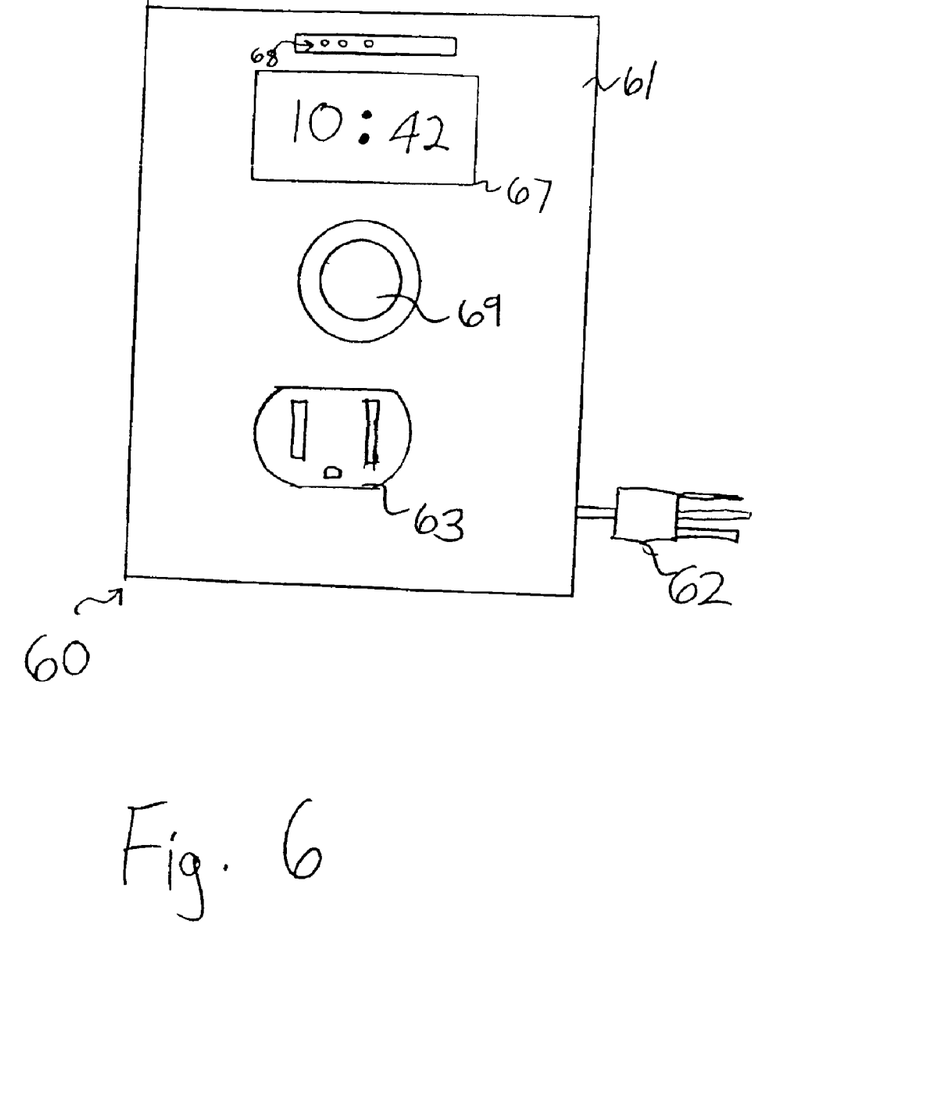
FIG. 6 is a schematic of a timer and photosensor in accordance with another embodiment of the present invention.

Referring now to FIG. 6, in an alternate embodiment, switch 60 is in the form of a wall outlet timer. A control module 61 includes a plug with prongs 62 designed to fit into a wall power outlet. The control module 61 also includes an appliance outlet 63 to which an electrical device one wishes to turn on and off is plugged. Switch 60 includes a time display 67, time adjustment buttons 68 and toggle on/off switch 69 having the same functions as the corresponding elements of the switch in the first embodiment depicted in FIGS. 1–5. The plug with prongs 62 and appliance outlet 63 can be modified to accommodate international outlet standards.

A light sensor module such as sensor module 30 is operatively associated with the control module 61 and transmits a light signal to the control module 61 based on light levels as discussed with regard to the prior embodiment. The light module may be wirelessly connected to the control module 61 like sensor 30. Alternatively, the light module may be directly wired to the control module 61.

The switch 60 operates in an analogous manner to the switch in the first embodiment to provide power to the appliance outlet 63 when outside lighting levels are below a threshold level and the time is before a set-off time.

The present switches have a number of important advantages over existing products. The switches automatically turns an electrical device, such as a light, on at dusk, whenever it occurs, and turns it off at a preprogrammed time. This assures that the lights are on when needed but are not wasting energy by being on all night.

A further feature of one form of the present invention is that the switch uses a small, unobtrusive sensor module which is easily applied to the inside of any household window. There are no external wires or batteries associated with this sensor. This makes it easy to install and there are no dead batteries to worry about.

An additional feature of one form of the present invention is provided by an attractive, low profile faceplate which easily installs over an existing switch plate, including multiple gang plates. Prior switches discussed above are neither slim nor attractive.

Yet another feature is provided by a large, easy-to-use touch pad switch that provides manual light control at any time. Manual operation on competing products is much less obvious.

A further feature of the present switch is provided by a visual indicator which illuminates when power is being supplied to an electrical device such as an outdoor light. This confirms the proper operation of the switch and is helpful for switch locations where the outdoor light is not within view.

An additional feature is provided by an easily programmable unit which is set in a manner similar to methods used with setting conventional alarm clocks. There are no complicated programming sequences to be mastered as are found in many competing products.

Further advantages of the present invention include a substantial measure of convenience, safety and energy savings for a reasonable price. In addition, installation is optimized for a do-it-yourself homeowner.

While the invention has been described in detail with reference to the preferred embodiments thereof, it will be apparent to one skilled in the art that various changes and modifications can be made and equivalents employed, without departing from the present invention.

What is claimed is:

1. A switch for turning on and off an electrical device, said switch comprising:
   a control module comprising a time module and an electrical output connectable to an electrical device, said time module comprising a clock programmable for disconnecting power to the electrical device at a set-off time; and
   a light sensor module wirelessly connected to said control module and transmitting a light sensor signal to said control module based on light level, said control module adapted to provide power to the electrical output when the light module indicates the light level is below a threshold level and the time is before the set-off time, thereby providing power to an electrical device connected to said electrical output.

2. The switch of claim 1, wherein said light sensor is solar powered.

3. The switch of claim 1, wherein said light sensor is battery powered.

4. The switch of claim 1, wherein said light sensor is wirelessly connected to said control module via RF.

5. The switch of claim 1, wherein said light sensor is wirelessly connected to said control module via infrared.

6. The switch of claim 1, wherein said light sensor is wirelessly connected to said control module via carrier frequency.

7. The switch of claim 1, when said light sensor only sends a light sensor signal to said control module when lighting conditions transition from:
   (1) above to below a threshold light level, or
   (2) below to above a threshold light level.

8. The switch of claim 1, when said light sensor sends a continuous light sensor signal to said control module when lighting conditions transition from:
   (1) above to below a threshold light level, or
   (2) below to above a threshold light level.

9. A wall switch for turning on and off an electrical device, said switch comprising:
   a control module comprising a body dimensioned to fix into a standard electrical wall box, said control module having an electrical output connectable to an electrical device and a time module having a clock programmable for disconnecting power to the electrical device at a set-off time; and
   a light sensor module operatively associated with said control module and transmitting a light sensor signal to said control module based on light level, said control module adapted to provide power to the electrical output when the light module indicates the light level is below a threshold level and the time is before the set-off, thereby providing power to an electrical device connected to said electrical output.

10. The wall switch of claim 9, wherein said light sensor module is operatively associated with said control module is a wireless connection.

11. The wall switch of claim 10, wherein said light sensor is wirelessly connected to said control module via RF.

12. The wall switch of claim 10, wherein said light sensor is wirelessly connected to said control module via infrared.

13. The wall switch of claim 10, wherein said light sensor is wirelessly connected to said control module via carrier frequency.

14. The wall switch of claim 9, when said light sensor only sends a light sensor signal to said control module when lighting conditions transition from:
  (1) above to below a threshold light level, or
  (2) below to above a threshold light level.

15. The wall switch of claim 9, when said light sensor sends a continuous light sensor signal to said control module when lighting conditions transition from:
  (1) above to below a threshold light level, or
  (2) below to above a threshold light level.

16. A wall outlet timer for turning on and off an electrical device, said timer comprising:
  a control module comprising a time module, prongs dimensioned to fit into a wall power outlet, and an appliance outlet, said time module having a clock programmable for disconnecting power to the electrical device at a set-off time; and
  a light sensor module operatively associated with said control module and transmitting a light sensor signal to said control module based on light level, said control module adapted to provide power to the appliance outlet when the light module indicates the light level is below a threshold level and the time is before the set-off time.

17. The wall outlet timer of claim 16, wherein said light sensor module operatively associated with said control module as a wireless connection.

18. The wall outlet timer of claim 17, wherein said light sensor is wirelessly connected to said control module via RF.

19. The wall outlet timer of claim 17, wherein said light sensor is wirelessly connected to said control module via infrared.

20. The wall outlet timer of claim 17, wherein said light sensor is wirelessly connected to said control module via carrier frequency.

21. A method for turning on an electrical device when lighting conditions fall below a threshold level and off at a set off-time, said method comprising:
  connecting an electrical device to a timer module;
  providing a light sensor operatively associated with the timer module;
  sending a light signal from the light sensor to the timer module only when the light condition transitions from:
   (1) above to below a threshold light level, or
   (2) below to above a threshold light level;
  setting an off time on the timer module after which the electrical device is to be off; and
  providing power to the electrical device when both the light sensor indicates the light level is below a threshold level and the time is before the off time.

22. The method of claim 21, wherein said sending a light signal comprises sending the light via wireless transmission.

23. The method of claim 22, wherein the wireless transmission is RF.

24. The method of claim 22, wherein the wireless transmission is infrared.

25. The method of claim 22, wherein the wireless transmission is a carrier frequency.

* * * * *